United States Patent
Kim et al.

(10) Patent No.: US 9,581,735 B2
(45) Date of Patent: *Feb. 28, 2017

(54) BACKLIGHT UNIT INCLUDING ARRAY OF HYPERBOLICALLY-SHAPED MICRO LENSES

(75) Inventors: Byoung-Mook Kim, Daejeon (KR); Kwang-Seung Park, Daejeon (KR); Byung-Su Park, Daejeon (KR); Yune-Hyoun Kim, Daejeon (KR); Sang-Choll Han, Daejeon (KR); Jin-Hyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 372 days.

This patent is subject to a terminal disclaimer.

(21) Appl. No.: 14/359,032

(22) PCT Filed: Jan. 13, 2012

(86) PCT No.: PCT/KR2012/000336
§ 371 (c)(1),
(2), (4) Date: May 16, 2014

(87) PCT Pub. No.: WO2013/105683
PCT Pub. Date: Jul. 18, 2013

(65) Prior Publication Data
US 2014/0313697 A1 Oct. 23, 2014

(51) Int. Cl.
*G02F 1/13357* (2006.01)
*G02B 3/00* (2006.01)
(Continued)

(52) U.S. Cl.
CPC ............. *G02B 3/005* (2013.01); *G02B 3/0056* (2013.01); *G02B 5/045* (2013.01); *G02F 2001/133607* (2013.01)

(58) Field of Classification Search
CPC ....................... F21V 5/004; F21V 5/007; G02F 2001/133607; G02B 3/0037; G02B 3/005; G02B 3/0056
See application file for complete search history.

(56) References Cited

U.S. PATENT DOCUMENTS 8,628,231 B2 * 1/2014 Paek ................. G02F 1/133606
362/615
9,134,463 B2 * 9/2015 Kim ...................... G02B 3/0037
(Continued)

FOREIGN PATENT DOCUMENTS

CN 1947034 A 4/2007
JP 11-258604 A 9/1999
(Continued)

OTHER PUBLICATIONS

Office Action of Chinese Patent Office in Appl'n. No. 201280022265.0, dated May 17, 2016.
(Continued)

*Primary Examiner* — Ismael Negron
(74) *Attorney, Agent, or Firm* — Dentons US LLP

(57) ABSTRACT

A backlight unit includes a light source and a two-dimensional micro lens array (MLA) sheet including a plurality of lens unit each having a conic lens shape with a cross-section, taken through the lens axis, having a shape defined by the equation:

$$y = \frac{x^2/r}{1 + \sqrt{1 - (1+k)(1/r)^2 x^2}}$$

where k is a constant with a value of less than or equal to −1, and r is the radius of curvature at the peak of the lens unit.

14 Claims, 5 Drawing Sheets

(51) Int. Cl.
G02B 5/04 (2006.01)
G02F 1/1335 (2006.01)

(56) References Cited

U.S. PATENT DOCUMENTS

| 2004/0004770 A1* | 1/2004 | Ebina | G03B 21/625 |
| | | | 359/648 |
| 2006/0204720 A1* | 9/2006 | Biernath | C08J 5/18 |
| | | | 428/156 |
| 2007/0242478 A1* | 10/2007 | Arima | G02B 3/06 |
| | | | 362/627 |
| 2012/0002440 A1 | 1/2012 | Lin et al. | |
| 2012/0147334 A1 | 6/2012 | Mizushima et al. | |

FOREIGN PATENT DOCUMENTS

| JP | 2000-305041 A | | 11/2000 |
| JP | 2005-227334 A | | 8/2005 |
| JP | 2009258621 A | * | 11/2009 |
| JP | 2011-48266 A | | 3/2011 |
| KR | 10-2009-0035373 A | | 4/2009 |
| KR | 10-2012-0008007 A | | 1/2012 |
| TW | 200704970 A | | 2/2007 |
| WO | 2011/161931 A1 | | 12/2011 |

OTHER PUBLICATIONS

Office Action of Chinese Patent Office in Appl'n No. 201280022265.0, dated Oct. 21, 2015.
Office Action of Japanese Patent Office in Appl'n. No. 2014-515707, dated Sep. 24, 2014.

* cited by examiner (a)

(b)

(c)

(a)

(b)

BACKLIGHT UNIT INCLUDING ARRAY OF HYPERBOLICALLY-SHAPED MICRO LENSES

This application is a National Stage Application of International Application No. PCT/KR2012/000336, filed Jan. 13, 2012, the disclosures of which are incorporated herein by reference in their entirety.

TECHNICAL FIELD

The present invention relates to an optical sheet used in a backlight unit and a backlight unit including the same, and more particularly, to a backlight unit including a micro lens array sheet structure having improved optical characteristics as compared to that of the related art and an optical film having the micro lens array sheet structure.

BACKGROUND ART

Liquid crystal display devices are electronic devices for converting electrical signals generated from various devices into visual information by using variations in the transmissivity of liquid crystals caused by a voltage applied thereto.

Owing to merits such as small size, lightness, and low power consumption, liquid crystal display devices have been prominent as replacements for cathode ray tubes (CRTs) widely used in the related art, which are capable of overcoming disadvantages of the CRTs, and currently, they have been mounted in almost all of information processing apparatuses requiring display devices.

In such a liquid crystal display device, a voltage is applied to liquid crystals to change the molecular arrangement thereof and thus convert changes in optical characteristics of the liquid crystals such as birefringence, optical rotatory power, dichroism, light scattering or the like into visual changes. That is, liquid crystal display devices may modulate light using liquid crystals.

Since liquid crystal display devices do not produce light themselves, additional light sources are necessary to illuminate liquid crystal device screens. Such illumination light sources are generally called backlight units.

In general, backlight units may be classified as edge-type backlight units and direct-type backlight units, according to the position of a light emitting lamp. Edge-type backlight units include a lamp at a side of a light guide panel that guides light emitted from the lamp. Edge-type backlight units are used in small liquid crystal display devices such as desktop computer monitors and laptop computers and are advantageous in terms of evenness of lighting, durability, and size reduction. On the other hand, direct-type backlight units are developed for application in display devices having 20-inch or larger screens and may directly illuminate the entire surface of a liquid panel by having a plurality of lamp light sources arranged under the liquid crystal panel.

Linear light sources such as cold cathode fluorescent lamps (CCFLs) were previously widely used as lamps for backlight units. However, light emitting diodes (LEDs) are now widely used as lamps for backlight units due to merits thereof, such as good color reproductivity, environmental-friendliness, slimness and lightness, and low power consumption.

Meanwhile, a plurality of optical films may be variously combined and used in a backlight unit according to the related art for the purpose of diffusing or concentrating light generated from a light source, improving brightness, or reducing lamp mura.

Recently, brightness and a viewing angle have become very important properties in image display devices, such as an LCD device, and the properties are known to be determined by optical sheet properties. Recently, hemispherical micro lens array sheets have been widely used; however, hemispherical micro lens array sheets have limitations in terms of an increase in luminance and defects, in that luminosity thereof is relatively deteriorated in the case of improving the viewing angle.

Currently, research and development aimed at the slimming and lightning of a backlight unit is ongoing, and in particular, a micro lens array sheet having improved luminance and viewing angle characteristics and a backlight unit including the same are required.

DISCLOSURE

Technical Problem

The present invention is to solve the problem of low luminance, identified as a defect in a micro lens array sheet according to the related art, and an aspect of the present invention provides a micro lens array sheet having luminance on a level equal to or greater than that of a prism sheet and excellent viewing angle improvements, and a backlight unit including the same.

Technical Solution

According to an aspect of the present invention, there is provided a micro lens array (MLA) sheet comprising a plurality of lens units two-dimensionally arranged thereon, wherein each lens unit has a conic lens shape of which a vertical cross-section taken in a lens center is represented by the following Expression 1:

$$y = \frac{x^2/r}{1 + \sqrt{1 - (1+k)(1/r)^2 x^2}} \quad \text{[Expression 1]}$$

where k is a conic constant, and r is a radius of curvature at a peak of the lens unit, wherein, k≤−1.

According to another aspect of the present invention, there is provided a backlight unit including: a light source; and at least one micro lens array (MLA) sheet according to the aforementioned aspect of the present invention.

Advantageous Effects

Since a hemispherical micro lens array sheet according to the related art has limitations in terms of increasing luminance, it may be difficult to substitute a prism sheet with the hemispherical micro lens array sheet in a high luminance product. However, in the case of using a micro lens array sheet formed of a conic lens, luminance and viewing angle characteristics can be simultaneously improved, and a backlight unit having superior optical properties may be obtained through a specific sheet configuration thereof.

BEST MODE

Hereinafter, embodiments of the present invention will be described in detail with reference to the drawings.

The present invention relates to an optical sheet including conic lens units arranged in a micro lens array (MLA) on a light emitting surface thereof. More particularly, an optical film according to embodiments of the present invention, a micro lens array sheet including a plurality of lens units two-dimensionally arranged thereon, may include lens units respectively having conic lens shapes.

In the embodiments of the present invention, "a conic lens" may denote a lens of which a vertical cross-section taken in a lens center may have a symmetrical curved shape, such as a hyperbolic curve or a parabolic curve. However, the conic lens according to the embodiments of the present invention may exclude a conically-shaped lens having a triangular vertical cross-section, a hemispherical lens having a semicircular vertical cross-section, or an oval lens having an oval vertical cross-section, taken in a lens center.

More particularly, each of the lens units according to the embodiment of the present invention may be a conic lens shape of which a cross-section (hereinafter, referred to as 'a vertical cross-section') vertically taken from a lens center to a sheet surface has a curved shape represented by the following Expression 1:

$$y = \frac{x^2/r}{1+\sqrt{1-(1+k)(1/r)^2 x^2}}$$ [Expression 1]

where, r is a radius of curvature at a peak of the lens unit, and k is a conic constant.

Here, the conic constant k determines a shape of a lens. In the case of k=0, the lens may be circular; in the case of k=−1, the lens may be parabolic; in the case of −1<k<0, the lens may be oval; and in the case of k<−1, the lens may be hyperbolic.

As described above, since the embodiments of the present invention may exclude a case in which a vertical cross-section of a lens unit is circular or oval, the conic constant k may have a range of k≤−1.

More particularly, in the lens units of the present invention, the conic constant k may be about −3 to −1, preferably about −2.7 to −1.7, and more preferably about −2.65 to −1.75. When the conic constant k is less than −3, optical luminance may be deteriorated, while when the conic constant k exceeds −1, optical shielding properties together with optical luminance may be deteriorated.

Figure 1:
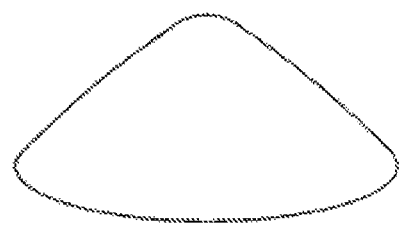
FIG. 1 are views showing shapes of a lens configuring a micro lens array sheet, and illustrate (a) a conic lens according to an embodiment of the present invention, (b) a hemispherical lens, and (c) a conically-shaped lens, respectively.
Figure 1:
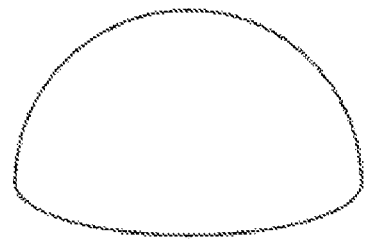
Figure 1:
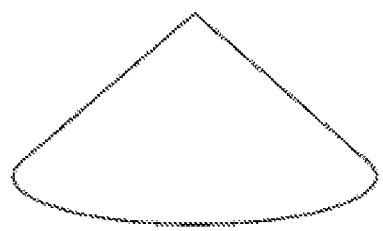

FIG. 1 (a) is a view illustrating a lens unit according to an embodiment of the present invention. Meanwhile, FIG. 1 (b) is a view illustrating a hemispherical lens and FIG. 1 (c) is a view illustrating a conically-shaped lens, which show examples of a lens unit excluded from the embodiment of the present invention.

The lens units according to the embodiment of the present invention may be arranged on a micro lens array sheet while having a constant pitch P. Here, the pitch P may refer to a distance between peaks of adjacent lens units. In the embodiment of the present invention, the pitch P between adjacent lens units may be about 10 μm to 500 μm, preferably about 30 μm to 70 μm. When the pitch P between the lens units is less than 10 μm, the lens units overlap with each other, such that light-condensing performance may be degraded, the level of difficulty in fabricating a mold for manufacturing a sheet may be increased, and defects vulnerable to scratches may be generated. Meanwhile, when the pitch P between the lens units is greater than 500 μm, a gap between the lens units may be generated, such that luminance loss may be caused and mold fabricating costs may be increased. Further, a range of the pitch P may be made in consideration of difficulties in a manufacturing process or quality defects in appearance, such as moiré phenomenon or the like.

Meanwhile, a shape of the lens unit according to the embodiment of the present invention may be specified in detail by a bottom diameter D thereof. In the embodiment of the present invention, the bottom diameter D of the lens unit may be 90 to 116%, preferably 92 to 116%, and most preferably 98 to 116%, of the pitch P between the lens units. When the bottom diameter D of the lens unit is less than 90% or exceeds 116% of the pitch P, the level of working difficulty and defect possibility in fabricating the film may be increased, while optical luminance may be degraded. When the bottom diameter D of the lens unit is within the range according to the embodiment of the present invention, satisfactory light condensing efficiency may be obtained. Meanwhile, a height H of the lens unit may be determined by Expression 1 and the bottom diameter D of the lens unit.

Meanwhile, the lens units formed on the micro lens array sheet according to the embodiment of the present invention may have the same shape and size or different shapes and sizes; however, considering processing easiness and light emitting distribution, it may be more desirable to arrange the lens units having the same shape and size.

In addition, the pitch P between the lens units formed on the micro lens array sheet according to the embodiment of the present invention may be constant or different; however, a case in which a length of the pitch P is constant may be desirable.

Meanwhile, the radius of curvature r at a peak of the lens unit may be 0.2 to 26% of the pitch P between the lens units, preferably 0.2 to 24%, and most preferably 0.2 to 22%; however, the radius of curvature r is not limited thereto. When the radius of curvature r is less than 0.2%, the possibility of occurring peak-related defects may be increased in a product mass-production, defects vulnerable to scratches may be generated, problems such as bubble generation, production time delay, and the like may caused. When the radius of curvature r exceeds 26% of the pitch P, light condensing performance, optical luminance, and light source shielding performance may be restricted.

Figure 2:
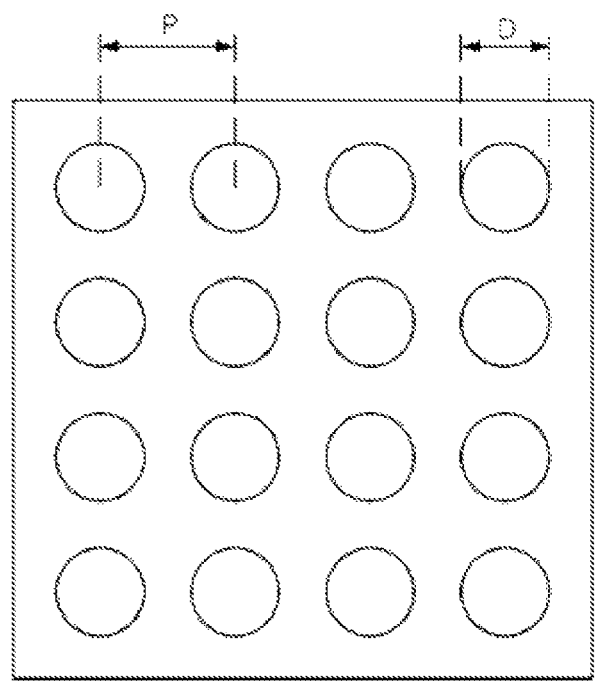
FIG. 2 are views illustrating (a) a front view and (b) a cross-sectional view of a micro lens array sheet according to an embodiment of the present invention.
Figure 2:

Meanwhile, the lens units may be regularly or irregularly arranged on a micro lens array sheet according to an embodiment of the present invention. FIG. 2 are views illustrating (a) a front view and (b) a cross-sectional view of a micro lens array sheet according to an embodiment of the present invention. FIG. 2 illustrate that the lens units are regularly arranged. FIG. 2 are views merely illustrating an arrangement of the lens units; the present invention is not limited thereto. Although not illustrated, for example, the lens units according to the embodiment of the present invention may be arranged in a honeycomb structure. When the lens units are arranged in a honeycomb structure, a flat surface (hereinafter, referred to as 'a gap') may not be generated between the lens units. Further, density between lenses may be increased to improve light condensing efficiency, thereby resulting in a high level of luminance.

Meanwhile, the micro lens array sheet according to the embodiment of the present invention may be manufactured by an arbitrary method for manufacturing a micro lens array sheet commonly known in the related art, for example, a method of pouring or injecting a curable resin solution into a mold engraved with lens unit shapes, and then curing the solution, a method of arranging symmetrical beads, a reflow method using photolithography, a direct machining method using a laser, a method using photolithography, or the like.

Meanwhile, a material of the micro lens array sheet according to the embodiment of the present invention may be a curable resin, such as urethane acrylate, epoxy acrylate, ester acrylate, a radical generated monomer or the like, which may be used alone or in combination; however, the present invention is not limited thereto.

Meanwhile, when a micro lens array sheet is manufactured by using a mold, lenses having various shapes, heights and pitches may be formed through a mold engraved with various shapes. In addition to this, various methods for manufacturing a micro lens array sheet have been known to the related art, and the micro lens array sheet according to the embodiment of the present invention may be manufactured by another manufacturing method according to the related art, besides the above methods.

Meanwhile, according to an embodiment of the present invention, there is provided a backlight unit including at least one micro lens array sheet. More particularly, a backlight unit including at least one micro lens array sheet according to the embodiment of the present invention, disposed on a light source may be provided. Here, two or more micro lens array sheets according to the embodiment of the present invention may be disposed on the light source. When two or more micro lens array sheets according to the embodiment of the present invention may be disposed, an excellent level of luminance equal to that of a prism sheet may be realized, while viewing angle improvements may be drastically achieved (refer to FIG. 4).

Meanwhile, kinds of the backlight unit may include a direct type backlight unit and an edge type backlight unit.

Figure 3:
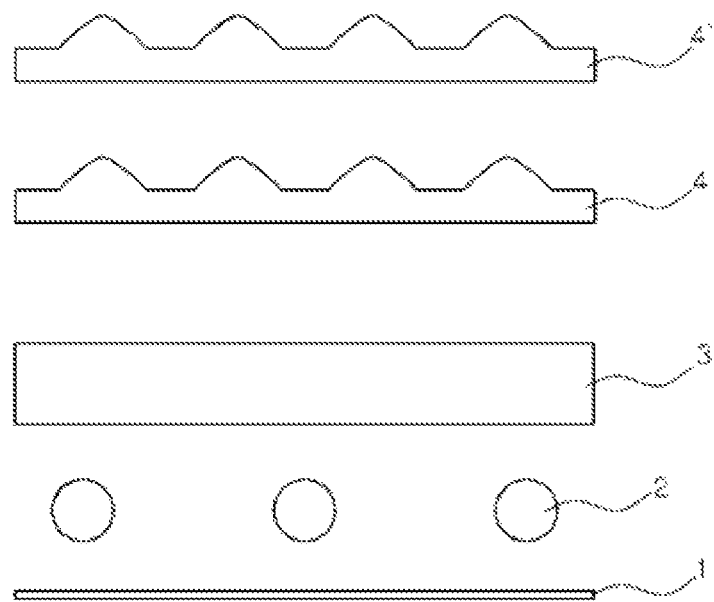
FIG. 3 is a view illustrating a backlight unit including a micro lens array sheet according to an embodiment of the present invention.

FIG. 3 is a view illustrating a backlight unit according to an embodiment of the present invention, and shows a direct type backlight unit. As illustrated in FIG. 3, the backlight unit according to the embodiment of the present invention may include a reflective plate 1 for reflecting light reflected from a rear surface towards a light emitting surface, a plurality of line light sources 2 disposed to be spaced apart at constant distances, a diffusion plate or a diffusion sheet 3 for converting light emitted from the line light sources into a surface light source and serving as a support for optical films, and at least one micro lens array sheet 4 or 4' according to the embodiment of the present invention, disposed thereon.

Meanwhile, the backlight unit according to the embodiment of the present invention may further include an additional optical film in addition to the micro lens array sheet according to the embodiment of the present invention, for example, at least one optical film selected from a group consisting of a diffusion film, a prism film, a lenticular lens film, and a reflective polarizing film.

For example, the backlight unit according to the embodiment of the present invention may further include a prism sheet together with the micro lens array sheet according to the embodiment of the present invention; and may additionally include at least one selected from a group consisting of a diffusion sheet, a reflective polarizing film and a lenticular sheet, in addition to the prism sheet and the micro lens array sheet.

In addition, the backlight unit according to the embodiment of the present invention may further include a diffusion sheet together with the micro lens array sheet according to the embodiment of the present invention; and may additionally include at least one selected from a group consisting of a lenticular sheet, a prism sheet, and the micro lens array sheet, in addition to the diffusion sheet and the micro lens array sheet.

Meanwhile, the backlight unit according to the embodiment of the present invention may include the optical films disposed in various orders and combinations. For example, the backlight unit according to the embodiment of the present invention may include a configuration in which a diffusion sheet and the micro lens array sheet according to the embodiment of the present invention are sequentially stacked; a configuration in which a prism sheet and the micro lens array sheet according to the embodiment of the present invention are sequentially stacked; a configuration in which the micro lens array sheet according to the embodiment of the present invention and a prism sheet are sequentially stacked; a configuration in which the micro lens array sheet according to the embodiment of the present invention, a prism sheet, and a reflective polarizing film are sequentially stacked; a configuration in which a diffusion sheet and two layers of the micro lens array sheet according to the embodiment of the present invention are sequentially stacked; a configuration in which a diffusion sheet, a prism sheet, and the micro lens array sheet according to the embodiment of the present invention are sequentially stacked; a configuration in which a lenticular sheet, a prism sheet, and the micro lens array sheet according to the embodiment of the present invention are sequentially stacked; and a configuration in which a diffusion sheet, a lenticular sheet, and the micro lens array sheet according to the embodiment of the present invention are sequentially stacked, in a direction from a light source to a liquid crystal panel.

In particular, the backlight unit having a combination of the optical films exemplified as above may realize a level of luminance equal to that of the prism sheet, while having superior viewing angle characteristics.

MODE FOR INVENTION

Hereafter, the present invention may be explained in detail through Examples. However, the following examples are merely provided for exemplary purposes and are not intended to limit the present invention.

EXAMPLES

1. Manufacturing of Micro Lens Array Sheet

Inventive Example 1

Micro Lens Array Sheet Including Conic Lenses

The micro lens array sheet according to the embodiment of the present invention was manufactured by using a laser mask processing method, and in this case, the diameter D of a conic lens was 55 μm, the radius of curvature r at a peak of the conic lens was 5.5 μm, the conic constant k was −2.15, and the pitch P was 50 μm.

Comparative Example 1

Micro Lens Array Sheet Including Conically Shaped Lenses

A micro lens array sheet was manufactured by the same method as that of Example 1, except that conically shaped lenses having a lens pitch of 50 μm, a diameter of 50 μm, and a vertical angle of 90 degrees were disposed on the micro lens array sheet.

Comparative Example 2

Micro Lens Array Sheet Including Hemispherical Lenses

A micro lens array sheet was manufactured by the same method as that of Example 1, except that hemispherical lenses having a lens pitch of 50 μm, a diameter of 50 μm, a radius of curvature r at a lens peak of 25 μm, and a conic constant k of 0 were disposed in the micro lens array sheet.

Inventive Examples 2 to 9 and Comparative Example 3

Respective micro lens array sheets were manufactured by the same method as that of Example 1 by variously setting a lens pitch, a diameter, a radius of curvature r at a lens peak and a conic constant k in the micro lens array sheets, as shown in the following Table 1.

2. Comparison of Luminance Characteristics According to Lens Shape

Two micro lens array sheets manufactured by each of Inventive Examples 1 to 9 and Comparative Examples 1 to 3 were used to verify optical simulation. The simulation was performed by setting an edge type LED light source having a size of 22 inches as a light source and a receiver disposed on the two sheets having the same shape. Pieces of viewing angle data regarding luminous intensity were compared and the results thereof are shown in Table. 1.

The following Table 1 shows a luminance value relatively indicated by % when it is assumed that a luminance value of Example 1 was set to be 100%.

TABLE 1

| Unit | Radius of Curvature (r) μm | Conic Constant (k) μm | Diameter (D) μm | Pitch (P) μm | Luminance % |
|---|---|---|---|---|---|
| Inventive Example 1 | 5.5 | −2.15 | 55 | 50 | 100 |
| Comparative Example 1 | 0.01 | −2 | 50 | 50 | 85 |
| Comparative Example 2 | 25 | 0 | 50 | 50 | 84 |
| Comparative Example 3 | 5.5 | −0.9 | 55 | 30 | 72 |
| Inventive Example 2 | 1.3 | −2.1 | 10 | 10 | 93 |
| Inventive Example 3 | 5.2 | −2 | 41 | 40 | 92 |
| Inventive Example 4 | 9 | −2 | 72 | 70 | 94 |
| Inventive Example 5 | 63 | −2 | 515 | 500 | 94 |
| Inventive Example 6 | 5.5 | −1 | 55 | 50 | 90 |
| Inventive Example 7 | 5.5 | −3 | 55 | 50 | 93 |
| Inventive Example 8 | 5.5 | −1.5 | 55 | 50 | 92 |
| Inventive Example 9 | 5.5 | −2.5 | 55 | 50 | 95 |

As can be seen in Table 1, it can be confirmed that the micro lens array sheets according to Inventive Examples of the present invention have excellent luminance characteristics, as compared to those of Comparative Examples 1 and 2 using conically shaped lenses and hemispherical lenses.

Further, compared with the luminance characteristics of the micro lens array sheet using oval lenses (k=0.9) of Comparative Example 3, it can be confirmed that the micro lens array sheets according to Inventive Examples of the present invention have significantly effective luminance characteristics.

3. Comparison of Luminance Characteristics According to Sheet Disposition

Experimental Example 1

Figure 4:
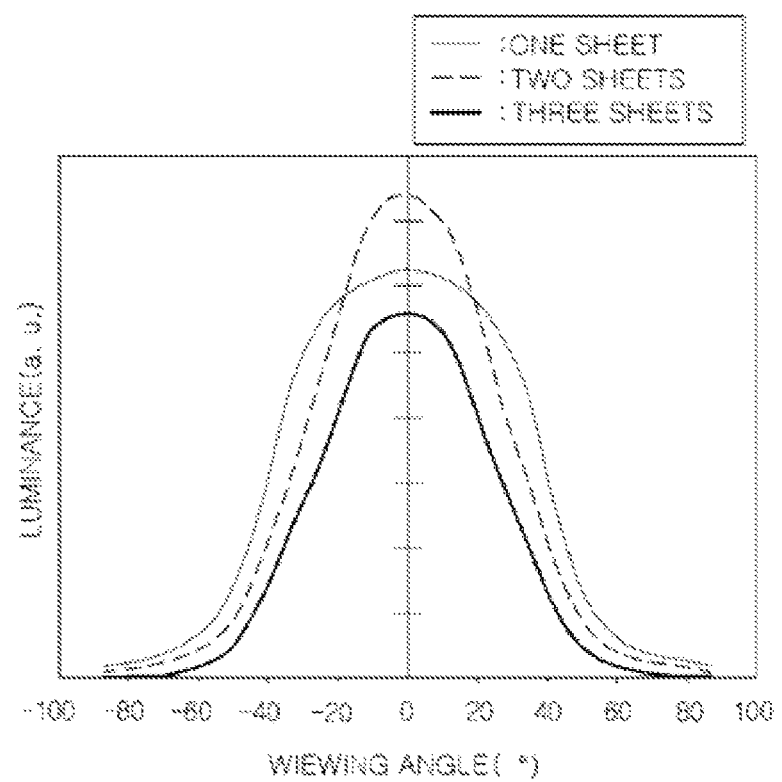
FIG. 4 is a graph illustrating luminance characteristics when one to three micro lens array sheets according to the embodiment of the present invention are disposed.

In order to compare luminance characteristics according to the Inventive Example of the present invention, luminance characteristics in the case of disposing two micro lens array sheets manufactured by Inventive Example 1 (Disposition Example 1) and luminance characteristics in the case of disposing one micro lens array sheet or three micro lens array sheets manufactured by Inventive Example 1, were measured and compared. Measurement Results are shown in FIG. 4. As can be seen in FIG. 4, it can be confirmed that luminance characteristics were significantly improved in the case of disposing two micro lens array sheets, as compared to the case of disposing one micro lens array sheet or the case of disposing three micro lens array sheets, manufactured by Inventive Example 1.

Meanwhile, the luminance characteristics were measured for respective sheet combinations through a luminance meter, BM7 (Topcon Co. Ltd., Japan) by using an edge type light source having a size of 22 inches as a backlight, based on a luminance value (nit) of 1 point in the center of a vertical direction.

Experiment Example 2

Figure 5:
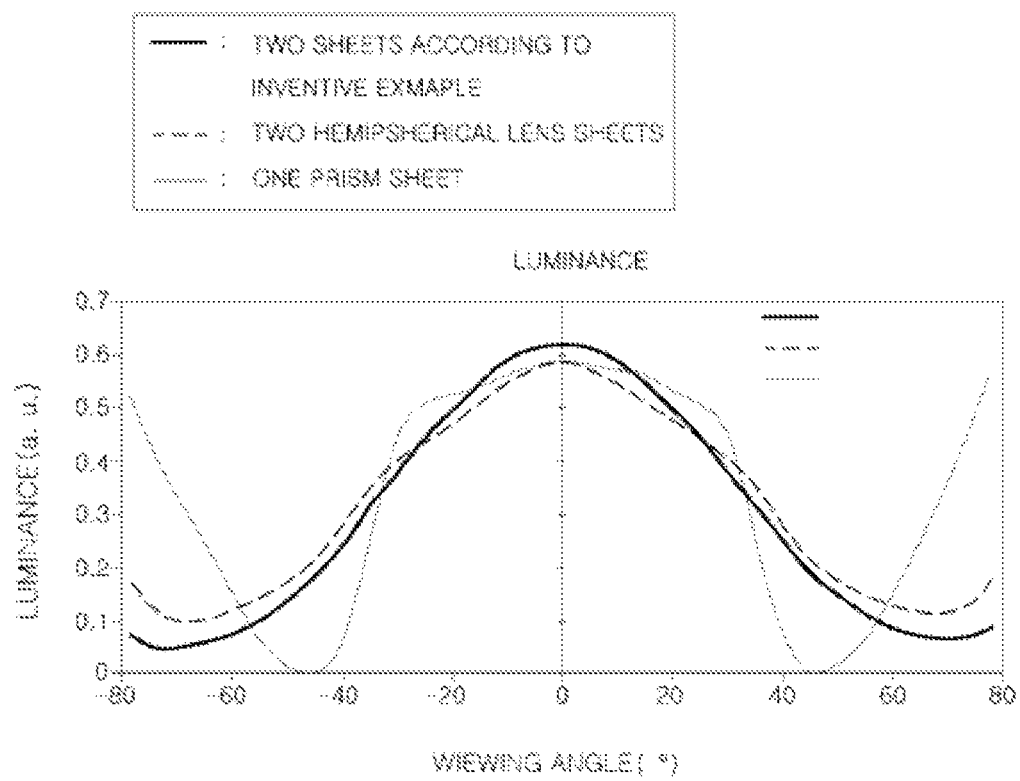
FIG. 5 is a graph comparing luminance characteristics when two micro lens array sheets according to the embodiment of the present invention are disposed with luminance characteristics when a prism sheet and a hemispherical micro lens array sheet are disposed.

Luminance characteristics in the case of disposing two micro lens array sheets manufactured by Inventive Example 1 and luminance characteristics in the case of disposing two micro lens array sheets manufactured by Comparative Example 2 or in the case of disposing a prism sheet, were measured and compared. Measured Results are shown in FIG. 5. As can be seen in FIG. 5, it can be confirmed that luminance characteristics were significantly excellent and a superior level of viewing angle characteristics were maintained in the case of disposing two micro lens array sheets manufactured by Inventive Example 1, as compared to the case of disposing two micro lens array sheets including hemispherical lenses or the case of disposing a prism sheet.

Meanwhile, the luminance characteristics were measured for respective sheet combinations through a luminance meter, BM7 (Topcon Co. Ltd., Japan) by using an edge type light source having a size of 22 inches as a backlight, based on a luminance value (nit) of 1 point in the center of a vertical direction.

Experiment Example 3

In order to compare luminance characteristics according to an optical sheet disposition of the backlight unit including the micro lens array sheet according to the Inventive Example of the present invention, luminance characteristics of backlight units in which optical sheets were disposed as in Tables 2 and 3 were compared, and result values are shown in Tables 2 and 3. In this case, the micro lens array sheet manufactured by Inventive Example 1 was used.

Meanwhile, the luminance characteristics were measured for respective sheet combinations through a luminance meter, BM7 (Topcon Co. Ltd., Japan) by using an edge type light source having a size of 22 inches as a backlight, based on a luminance value (nit) of 1 point in the center of a vertical direction.

The result values of Tables 2 and 3 show luminance values indicated by %, which were relatively improved when it was assumed that a luminance value in the case of using the micro lens array sheet of Comparative Example 2 is 100.0% as a standard, and the micro lens array sheet according to the Inventive Example of the present invention is disposed in the same manner.

TABLE 2

| | Disposition Example | | | | | | | | | |
|---|---|---|---|---|---|---|---|---|---|---|
| | 1 | 2 | 3 | 4 | 5 | 6 | 7 | 8 | 9 | 10 |
| Panel Surface ↑ Light source Surface | MLA MLA | MLA MLA DS | MLA Prism DS | MLA Lenti DS | MLA Prism Lenti90 | MLA DS | Prism MLA | MLA Prism Prism | RP Prism MLA | RP MLA Prism |
| Result (%) | 109.6 | 110.9 | 107.9 | 108.3 | 107.9 | 104.7 | 108.3 | 113.1 | 108.7 | 108.6 |

TABLE 3

| | Disposition Example | | | | | | | |
|---|---|---|---|---|---|---|---|---|
| | 1 | 2 | 3 | 4 | 5 | 6 | 7 | 8 |
| Panel Surface ↑ Light source Surface | MLA | DS MLA | DS DS MLA | DBEF DS MLA | DS MLA DS | DS DBEF MLA | DBEF MLA | DS Prism MLA |
| Result (%) | 100.5 | 102.1 | 100.1 | 100.3 | 100 | 101 | 101 | 101 |

MLA: Micro lens array sheet manufactured according to Example 1 of the present invention
DS: Diffusion sheet
Prism: Prism sheet
RP: Reflective polarizing film
Lenti: Lenticular sheet The diffusion sheet is trade name CH282 (Manufacturer: SKC), the prism sheet is trade name BEF2 (Manufacturer: 3M), the reflective polarizing film is trade name DBEF (Manufacturer: 3M), the lenticular sheet is trade name LSF465 (Manufacturer: LG chemistry), and the Lenti90 means that lenses are arranged in a vertical direction.

While the present invention has been shown and described in connection with the exemplary embodiments, it will be apparent to those skilled in the art that modifications and variations can be made without departing from the spirit and scope of the invention as defined by the appended claims.

<Symbol Description>
P: a pitch between the lens units.
1: a reflective plate
D: a bottom diameter of the lens unit
2: a light source
H: a height of the lens unit
3: a diffusion sheet
4, 4': A micro lens array sheet of the present invention

The invention claimed is:

1. A backlight unit comprising:
a light source; and
a micro lens array (MLA) sheet comprising a plurality of lens units two-dimensionally arranged thereon,
wherein the light source has the micro lens array (MLA) sheet, a prism sheet, and a reflective polarizing film, sequentially stacked thereon or,
wherein the light source has a prism sheet, the micro lens array (MLA) sheet, and a reflective polarizing film, sequentially stacked thereon,
wherein each lens unit has a conic lens shape of which a vertical cross-section taken in a lens center is represented by the following Expression 1:

$$y = \frac{x^2/r}{1 + \sqrt{1 - (1+k)(1/r)^2 x^2}} \quad \text{[Expression 1]}$$

where k is a conic constant, and r is a radius of curvature at a peak of the lens unit, wherein, k≤−1.

2. The backlight unit of claim 1, wherein the conic constant k is −3 to −1.

3. The backlight unit of claim 1, wherein the lens unit has a hyperbolic or parabolic vertical cross-section.

4. The backlight unit of claim 1, wherein a pitch between the lens units is 10 to 500 μm.

5. The backlight unit of claim 1, wherein a bottom diameter of the lens unit is 90 to 116% of a pitch between the lens units.

6. The backlight unit of claim 1, wherein a radius of curvature at a peak of the lens unit is 0.2 to 26% of a pitch between the lens units.

7. The backlight unit of claim 1, wherein the plurality of lens units are arranged in a honeycomb structure.

8. The backlight unit of claim 1, wherein the micro lens array (MLA) sheet includes two micro lens array (MLA) sheets.

9. The backlight unit of claim 1, further comprising at least one selected from a group consisting of a prism sheet, a lenticular lens sheet, a diffusion sheet, and a reflective polarizing film.

10. The backlight unit of claim 1, wherein the light source has a diffusion sheet and the micro lens array (MLA) sheet, sequentially stacked thereon.

11. The backlight unit of claim 1, wherein the light source has a diffusion sheet and two layers of the micro lens array (MLA) sheet, sequentially stacked thereon.

12. The backlight unit of claim 1, wherein the light source has a diffusion sheet, a prism sheet, and the micro lens array (MLA) sheet, sequentially stacked thereon.

13. The backlight unit of claim 1, wherein the light source has a diffusion sheet, a lenticular sheet, and the micro lens array (MLA) sheet, sequentially stacked thereon.

14. The backlight unit of claim 1, wherein the light source has a lenticular sheet, a prism sheet, and the micro lens array (MLA) sheet, sequentially stacked thereon.

* * * * *